INVENTOR.
LELAND E. THOMPSON
BY G. A. Rechif
ATTORNEY

INVENTOR.
LELAND E. THOMPSON
BY
ATTORNEY 3,042,867

COMMUNICATION SYSTEM WITH COMPENSATING MEANS FOR NON-LINEAR AMPLITUDE DISTORTIONS

Leland E. Thompson, Merchantville, N.J., assignor to Radio Corporation of America, a corporation of Delaware Filed Oct. 11, 1956, Ser. No. 615,296
7 Claims. (Cl. 325—50)

This invention relates to a communication system, and more particularly to a single sideband (SSB) frequency division multiplex (mux) system, in which the intelligence signals in the various mux channels are transmitted as different SSB signals at frequencies in the microwave region of the frequency spectrum. The system of this invention has particular utility in so-called scatter propagation links, that is, links involving communication between stations which are spaced apart farther than the line-of-sight distance. In general, the present invention falls in that known class of mux transmission which involves the heterodyning up to the microwave range of SSB frequency division mux signals, and the transmission of the microwave signal as a composite SSB signal with a predetermined small amount of carrier present.

It has been found that in scatter propagation communication links on the order of 200 miles the transmission bandwidth is limited by the progation medium, so that in these circumstances wide band frequency modulation signals experience distortion and crosstalk difficulties. Also, in some instances excessive fading will reduce the received signal below the noise-quieting threshold of the frequency modulation receiver, unless a very great amount of power is used at the transmitter.

An object of this invention is to provide a novel communication system, particularly suitable for scatter propagation service, which requires only a comparatively small transmission bandwidth.

Another object is to provide a novel SSB mux communication system employing amplitude modulation wherein the receiver does not have a sharp threshold of improvement, as do receivers in frequency modulation systems.

Because of the small bandwidth required and the non-thresholding characteristic of the receiver, very much less transmitter power is required for an acceptable communication circuit than would be required with frequency modulation.

With the system of this invention, which employs amplitude modulation transmission, the amplitude linearity of the overall transmitter-receiver system must be good, in order to prevent crosstalk in the mux channels. A further object of this invention, therefore, is to provide a novel arrangement for compensating for normal inherent amplitude nonlinearities of class B power amplifier stages in the transmitter.

A still further object is to provide a novel arrangement for adjusting the amount of carrier radiated by a single sideband-suppressed carrier (SSBSC) transmitter.

The objects of this invention are accomplished, briefly, in the following manner: An SSB mux signal is heterodyned up in frequency to the microwave range by means of a plurality of cascaded balanced modulators separated by bandpass filters which select and pass only a single sideband from the output of each modulator. Each modulator is also fed with energy from a suitable heterodyning source. The first modulator is well balanced and a connection feeds energy from the source of heterodyning energy connected thereto through an adjustable attenuator to the output of the first modulator to cause a predetermined small amplitude of energy from this same heterodyning energy source to appear in the output thereof. This heterodyning energy is heterodyned up in frequency to become the transmitted (but partially suppressed) carrier. By means of suitable compression and expansion circuits in the intermediate frequency (IF) stages of the receiver, or alternatively in the low power, low frequency circuits of the transmitter, amplitude linearity compensation of the class B power amplifier stage in the transmitter is effected.

A detailed description of the invention follows, taken in conjunction with the accompanying drawings, wherein.

Figure 1:
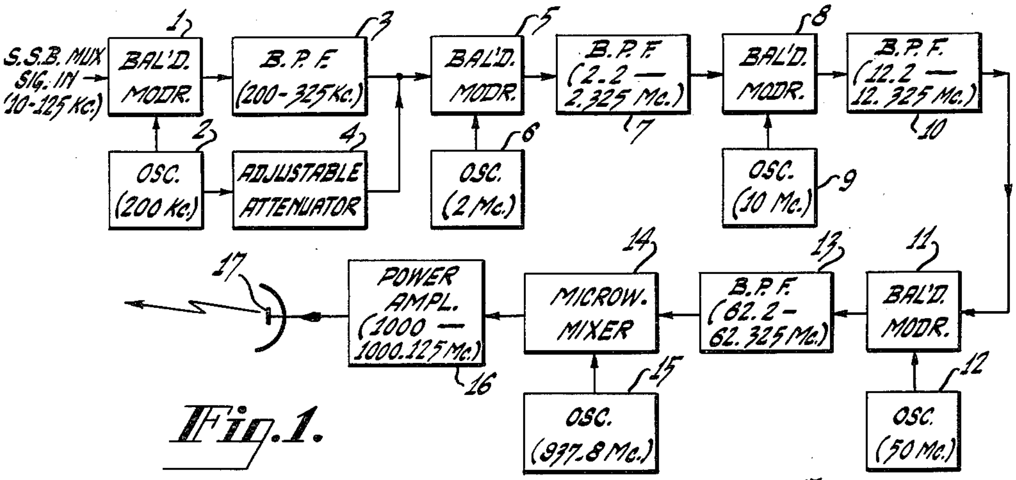
FIG. 1 is a block diagram of a transmitter according to this invention.

Referring first to FIG. 1, SSB frequency division mux signals, which may lie for example in the frequency range of 10 to 125 kc. (for a 24-channel voice system wherein each channel has assigned thereto a range of frequencies different from the frequencies in the other channels), are applied as one input to a balanced modulator 1, which may be adjustable to bring it into balance. The mux signals fed to modulator 1 may comprise a single amplitude modulation sideband for each channel, produced by separately modulating a subcarrier with the intelligence signals in each channel. An oscillator 2, having a frequency of 200 kc. for example, feeds heterodyning energy to modulator 1. Modulation or mixing occurs in modulator 1, developing sum and difference frequencies, as well as other frequencies. The upper sideband or sum frequencies (from 210 to 325 kc.) are selected and passed by a bandpass filter 3 which is receptive of the output of modulator 1. The other modulation products are rejected by filter 3.

The balance of modulator 1 to the 200-kc. energy from oscillator 2 is complete. Filter 3 is arranged to pass energy in the frequency range of 200 to 325 kc., as indicated in FIG. 1. Energy from oscillator 2 is fed through an adjustable attenuator 4 to the output side of filter 3. By means of attenuator 4, the amplitude level of the 200-kc. energy in the output of filter 3 may be adjusted independently of the balance of modulator 1. The 200-kc. signal (which may be thought of as the carrier signal for the modulator 1), after being heterodyned up in frequency in a manner to be described, is radiated as the (partially suppressed) carrier. The amplitude of this carrier is adjusted (by means of the adjustability of item 4) to a relatively low level, about equal to the level of one of the mux channels. This procedure saves a considerable amount of transmitter power. However, the transmitted (radiated) signal then cannot be demodulated until the carrier is amplified to a much higher level than that of the sidebands in the receiver. This carrier amplification (necessary for the usual amplitude modulation detector in a receiver) will be described hereinafter in connection with FIG. 3.

The output of bandpass filter 3 is applied as one input to a second balanced modulator 5. An oscillator 6, having a frequency of 2 mc. for example, feeds heterodyning energy to modulator 5. Modulation or mixing occurs in modulator 5, developing sum and difference frequencies, among other frequencies. The upper sideband or sum frequencies (from 2.2 to 2.325 mc.) are selected and passed by a bandpass filter 7 which is receptive of the output of modulator 5. The other modulation products are rejected by filter 7.

The output of bandpass filter 7 is applied as one input to a third balanced modulator 8. An oscillator 9, having a frequency of 10 mc. for example, feeds heterodyning energy to modulator 8. Modulation or mixing occurs in modulator 8, developing sum and difference frequencies, among other frequencies. The upper sideband or sum frequencies (from 12.2 to 12.325 mc.) are selected and passed by a bandpass filter 10 which is receptive of the output of modulator 8. The other modulation products are rejected by filter 10. Thus, modulator 8 provides a third step-up in frequency, the first two step-ups being provided by modulators 1 and 5.

For a fourth step-up in frequency, the output of filter 10 is applied as one input to a fourth balanced modulator 11. An oscillator 12, having a frequency of 50 mc. for example, feeds heterodyning energy to modulator 11. Modulation or mixing occurs in modulator 11, developing sum and difference frequencies, among other frequencies. The upper sideband or sum frequencies (from 62.2 to 62.325 mc.) are selected and passed by a bandpass filter 13 which is receptive of the output of modulator 11. The other modulation products are rejected by filter 13.

For a fifth step-up in frequency, the output of filter 13 is applied as one input to a microwave mixer 14. A microwave oscillator 15, having a frequency of 937.8 mc. for example, feeds microwave heterodyning energy to mixer 14. The output of mixer 14 includes a band of frequencies (the sum of the frequencies of oscillator 15 and the output of filter 13) extending from 1000 mc. to 1000.125 mc. This band of frequencies is amplified by a power amplifier 16 the output of which feeds a suitable transmitting antenna 17. Antenna 17 radiates the signal fed to it into space, and the signal radiated by this antenna is the transmitted signal of the system. Selective circuits in amplifier 16 prevent other modulation products developed in mixer 14 from being amplified and radiated by antenna 17.

Figure 2:
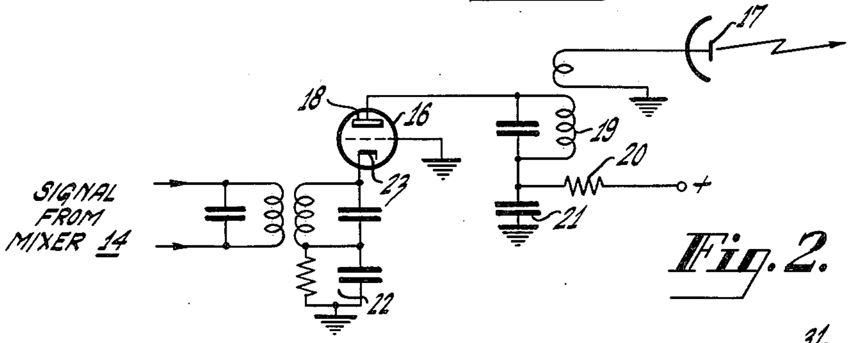
FIG. 2 is a detailed circuit diagram of a portion of FIG. 1.

FIG. 2 shows a preferred arrangement for the anode supply of the power amplifier 16 in the transmitter. Although circuits including lumped inductance and capacitance are shown in FIG. 2, this has been done only for ease in illustration; microwave cavity circuits would probably actually be used here. The power amplifier 16, shown as a triode, operates in a grounded-grid, cathode-fed circuit. Anode potential is supplied to anode 18 of tube 16 by way of a tuned inductance 19 and a resistor 20 from the positive terminal of a unidirectional anode potential source, so that the tube anode current actually flows through this resistor. A capacitor 21 is connected from the anode end of resistor 20 to ground. The radio frequency power amplifier stage 16 is normally operated with a comparatively high anode voltage and comparatively low anode current, partly as a result of the biasing network 22 connected from the cathode 23 of tube 16 to ground. Resistor 20 and capacitor 21 are not the usual, conventional radio frequency filter, but the values of these components are chosen so that the arrangement illustrated operates in the following manner. Capacitor 21 will maintain the anode supply voltage constant during very short and high level signal peaks. However, if the average signal input voltage to tube 16 becomes high due to a heavy traffic load (it will be remembered that mux signals are applied to the transmitter input), the current through resistor 20 will increase, increasing the voltage drop across this resistor and decreasing the anode voltage on tube 16, thus protecting the tube from damage. Although the power output per channel will then be reduced due to the decrease of anode voltage, operation will still be satisfactory during periods of normal propagation. During periods of low signal at the receiver due to adverse propagation conditions, the traffic load can be decreased (thus decreasing the average signal input voltage to tube 16). Then, the current through resistor 20 will decrease, increasing the anode voltage on tube 16 and automatically increasing the total transmitted power and also the transmitted power per channel. Thus, damage to the power amplifier tube is automatically prevented, and under adverse propagation conditions, the transmitted power per channel may be automatically increased.

As a typical example, the value of resistor 20 may be of the order of 1000 to 5000 ohms, while the value of capacitor 21 may be of the order of 10 to 20 microfarads.

In the transmitter of FIG. 1, the frequencies of each modulation stage 1, 5, 8, 11, and 14 are chosen to permit economical bandpass filters to be used at 3, 7, 10, 13, etc. Also, by using a comparatively large number of modulation or heterodyning stages, each bandpass filter may be made rather simple in construction, because the sideband frequencies rejected by the bandpass filters occur further from the desired sideband frequencies in each successive modulation stage.

Figures 3, 5:
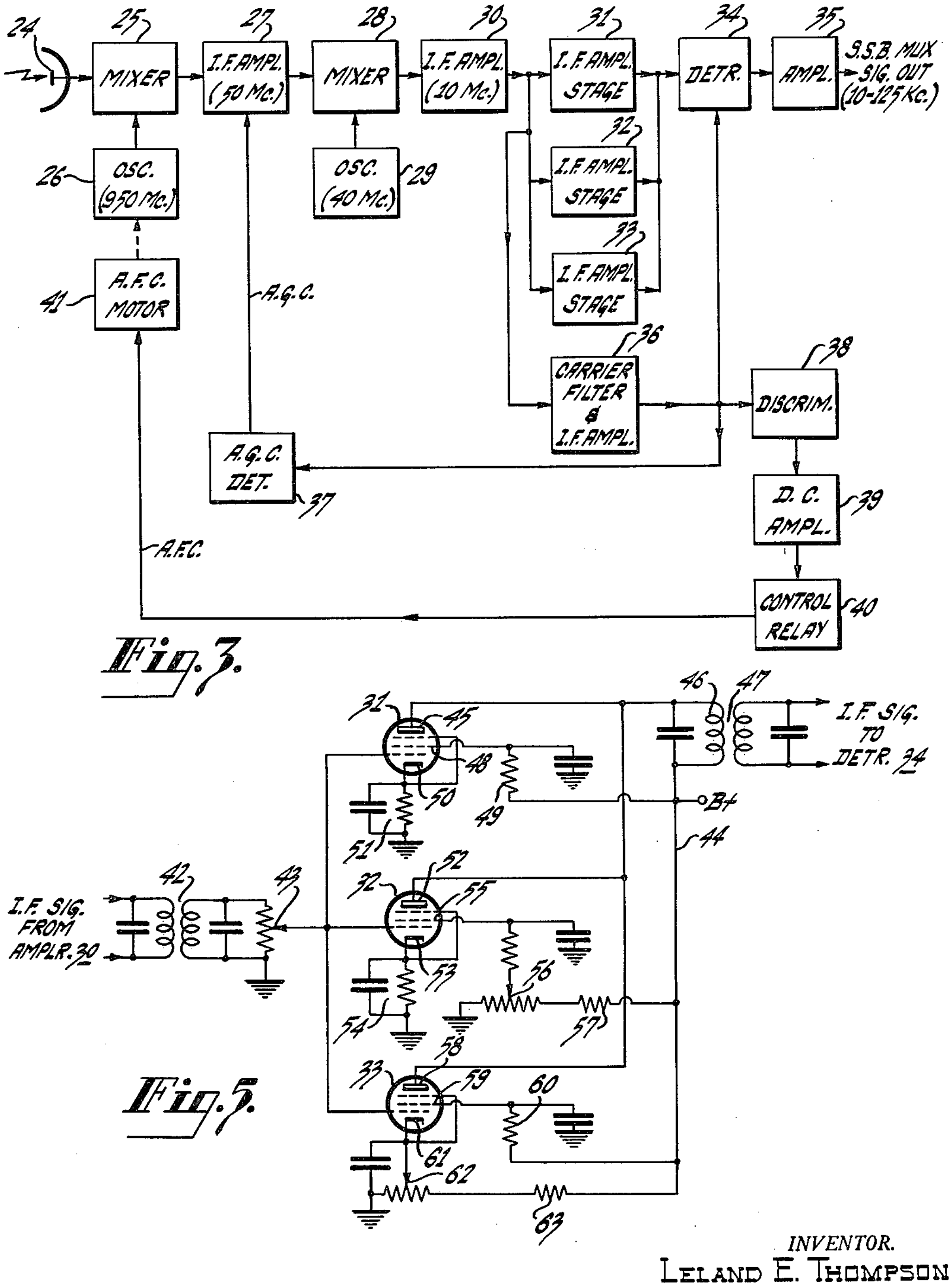
FIG. 3 is a block diagram of a receiver according to this invention.
FIG. 5 is a detailed circuit diagram of compression and expansion circuits useful for amplitude linearity compensation according to the invention.

FIG. 3 discloses a receiver according to this invention. The signal radiated from the antenna 17 of FIG. 1 is picked up by the receiving antenna 24 of FIG. 3 and fed into the first mixer 25, to which is also fed heterodyning energy from an oscillator 26, operating for example at a frequency of 950 mc. The signal at approximately 1000 mc. which is picked up by antenna 24 beats with 950-mc. energy from oscillator 26 in mixer 25, producing a difference frequency of 50 mc., which is in the IF range. This 50-mc. IF signal is amplified by an IF amplifier 27 tuned to 50 mc.

Although a single IF may be used, it is preferable to use a double conversion superheterodyne circuit, as shown in FIG. 3. The output of the first IF amplifier 27 is fed to a second mixer 28, to which is also fed heterodyning energy from an oscillator 29, operating for example at a frequency of 40 mc. The 50-mc. signal from amplifier 27 beats with 40-mc. energy from oscillator 29 in mixer 28, producing a difference frequency of 10 mc. This 10-mc. IF signal is amplified by an IF amplifier 30 tuned to 10 mc.

The output of amplifier 30 is fed in parallel to three IF amplifier stages 31, 32, and 33 which have their inputs and outputs connected in parallel. Stages 31–33 are special circuits which will be described in detail hereinafter. The combined output of amplifier stages 31–33 is fed to the input of an ordinary amplitude modulation detector 34, which is also supplied with carrier energy for demodulation of the signals, in a manner to be described hereinafter. The detector 34 demodulates the IF signals, returning them to their original range of 10–125 kc., and these output signals are amplified by an amplifier 35. Thus, at the output of the receiver of FIG. 3, there are produced signals in the range of 10 to 125 kc., and these SSB mux signals are fed to a suitable utilization device (not shown).

A portion of the output of IF amplifier 30 is fed to a carrier filter and IF amplifier unit 36. This carrier filter has a very narrow pass band, on the order of 3–5 kc. Unit 36 selects the carrier signal (which, it will be remembered, is transmitted at a partially suppressed level by the transmitter of FIG. 1) from the composite signal appearing at the output of amplifier 30, and amplifies it to a much higher level than the sideband signals. The high level carrier is then fed from the output of filter and amplifier 36 to the detector 34, for demodulation purposes.

The carrier IF amplifier 36 also supplies amplified carrier to the automatic gain control detector 37. The output of detector 37 is a D.C. automatic gain control voltage which is supplied over the line labeled "AGC" to IF amplifier 27, for controlling the gain of this amplifier automatically, in response to the strength of the received carrier.

Because the carrier filter in unit 36 has a very narrow pass band, excellent frequency stability of the receiver is necessary, and this is achieved through an automatic frequency control system. The automatic frequency control system comprises a frequency discriminator 38, a D.C. amplifier 39, a control relay 40, and a tuning motor 41. A portion of the carrier output of amplifier 36 is fed to the input of tuned frequency discriminator 38, which produces a D.C. voltage in response to variation of the frequency of the output of unit 36 from the frequency to which discriminator 38 is tuned. The polarity and magnitude of this produced voltage depend upon the sense and amount of frequency deviation from the frequency to which the discriminator is tuned. This D.C. voltage is amplified in amplifier 39 and used to operate relay 40 in such a way that motor 41 is energized to vary a frequency-controlling element in oscillator 26 to vary the frequency of this oscillator toward its correct value, it being seen that the frequency of oscillator 26 helps to determine the frequency of the signal in the output of amplifier 27. The oscillator 26 is preferably stabilized by a quartz crystal, in which case the tuning motor 41 may be mechanically coupled to a variable capacitor connected across the crystal, to effect a very precise frequency control.

The power amplifier stage 16 in the transmitter is ordinarily operated class B, for reasons of economy, since class B operation is more efficient than class A operation. Ordinarily, that is with a conventional system, the transmitter power amplifier is required to handle peak powers considerably higher than the R.M.S. power. This peak power capacity is not necessary to provide the required signal-to-noise ratio, but is required in order to provide the necessary amplitude linearity characteristic, since class B operation is more nonlinear than class A operation; the amplitude linearity of the system should be good, in order to prevent crosstalk or intermodulation in the mux system. In other words, with a conventional system the transmitter power amplifier must not overload on the peaks of the transmitted signal, so that a high power transmitter must be used.

According to this invention, the transmitter power amplifier is allowed to overload on the peaks of the transmitted signal and the necessary amplitude linearity is restored in the receiver IF circuits, or alternatively in the low power, low frequency circuits of the transmitter. Then, a lower-power transmitter may be used, which is very desirable for reasons of economy.

The action may be explained with reference to FIG. 4, which is a set of input-output curves. The input-output characteristic of the transmitter and receiver together (that is, the overall transmitter-receiver characteristic) should be a straight line, as illustrated at A in FIG. 4. Unless excessively large transmitter tubes are used, the transmitter linearity characteristic would be similar to the curve B in FIG. 4. This shape of curve is typical of transmitters using triodes, tetrodes, or pentodes, and follows in general the grid voltage-anode current characteristics of all vacuum tubes. With klystron power amplifiers, the lower part of curve B may be more linear, but the top part would bend (indicating overload) just as in curve B. Possibly, the bend in the lower part of curve B can be explained by the fact that in transmitters the power amplifiers are operated class B (which gives a higher efficiency); if they were operated class A, the lower part of the curve would be linear.

According to this invention, the IF stages 31–33 in the receiver are arranged to have a total or overall response such as to compensate the nonlinearities of curve B. This may be further explained in the following way. Assume that the input-output characteristics of all of the stages 31, 32, and 33 are plotted in FIG. 4, using the same scales as for curves A and B. Then, if at each input level the output levels of the transmitter (curve B) and of the stages 31–33 are added, values are obtained which define the straight line A. Thus, by means of the compression and expansion circuits 31–33 in the IF portions of the FIG. 3 receiver, amplitude linearity compensation of the class B power amplifier stage 16 is effected.

The compensating circuits (or compression and expansion circuits) 31–33 are shown in detail in the circuit diagram of FIG. 5. The input electrodes (control grids) of the three tubes 31, 32, and 33 are fed in parallel from the secondary of IF transformer 42, to the primary of which is applied IF signal from IF amplifier 30. The potentiometer 43 adjusts the level of the input signal fed to tubes 31, 32, and 33, the control grids of all three of these tubes being connected to the movable arm of this potentiometer.

Tube 31 is supplied with normal electrode polarizing potentials, so that it operates as a linear amplifier. Specifically, the anode 45 of tube 31 is connected to the B+ lead 44 through the primary winding 46 of the output transformer 47; the screen grid 48 of tube 31 is connected to lead 44 through a resistor 49; the cathode 50 of this tube is connected to ground through an RC self-biasing network 51. Tube 31, as stated, operates as a linear amplifier.

Tube 32 has its anode 52 connected directly to anode 45 of tube 31 and its cathode 53 connected to ground through an RC network 54 similar to network 51, but has a low voltage on its screen grid 55 as determined by the setting of a potentiometer 56 which is connected in series with a resistor 57 to form a voltage divider network between lead 44 and ground. Tube 32 therefore operates to provide partial limiting, because it overloads at an input level determined by the setting of the screen grid voltage potentiometer 56. Tube 32 thus has an input-output characteristic represented by curve C in FIG. 4. Tube 32 provides a compression circuit, due to the action described above, the limiting of high amplitude inputs.

Tube 33 has its anode 58 connected directly to anode 45 of tube 31 and its screen grid 59 connected to lead 44 through a resistor 60 similar to resistor 49, but has a positive bias on its cathode 61 as determined by the setting of a potentiometer 62 which is connected in series with a resistor 63 to form a voltage divider network between lead 44 and ground. This positive cathode bias biases the tube beyond cutoff and is of course equivalent to a negative control grid bias. Tube 33 is adjusted to be inoperative on low level input signals due to its beyond-cutoff bias, but on the peaks of the input signal wave the bias is overcome and this tube becomes operative (that is, it conducts) to increase the total output to the output transformer 47. Potentiometer 62 adjusts the bias on cathode 61 of tube 33 to the required operating point. Tube 33 thus has an input-output characteristic represented by curve D in FIG. 4. Tube 33 provides an expansion circuit, due to the action described above, the increasing of total output for high amplitude inputs.

Figures 4, 6:
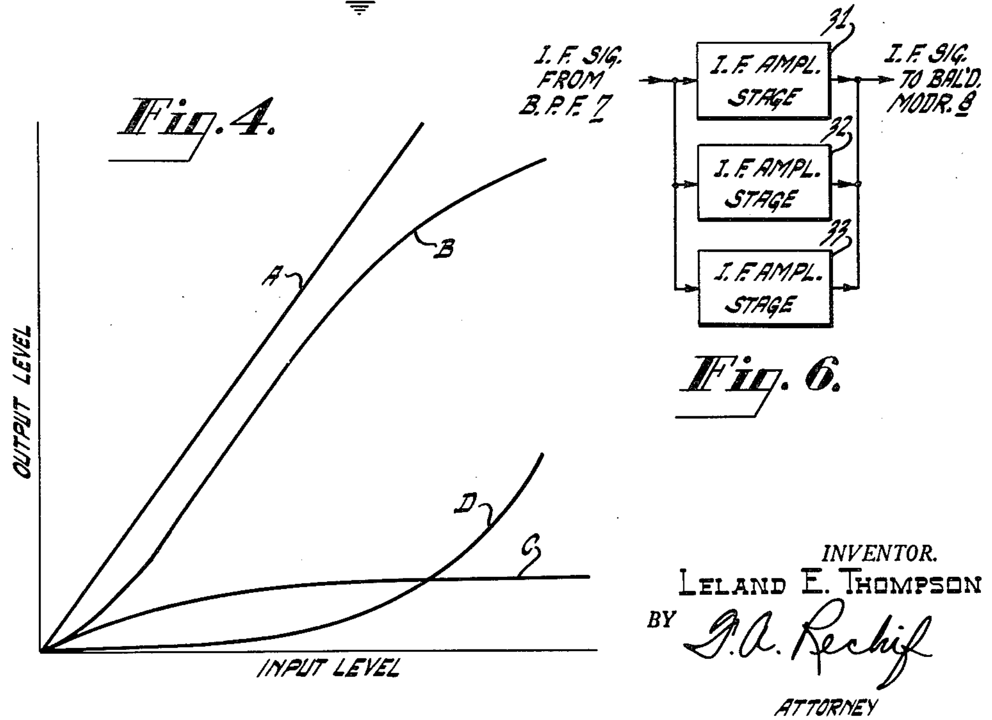
FIG. 4 is a set of curves useful in explaining one aspect of the invention.
FIG. 6 is a partial block diagram showing a modification of FIG. 1.

FIG. 4 does not include the linear input-output characteristic of tube 31. However, from an examination of curves B, C, and D, it may be seen that at each input level the sum of the output level values of curves B, C, and D, plus that of a linear characteristic (not shown in FIG. 4), may be made to equal the output level value of the corresponding point on the straight line A. Thus, nonlinearities in the amplitude response characteristic of the class B power amplifier stage 16 are compensated.

FIG. 3 shows the amplitude linearity compensation as being effected in the IF portion of the receiver. Alternatively, the linearity compensation can be, if desired, achieved in the transmitter alone, as illustrated in FIG. 6. Thus, the compression and expansion circuits 31, 32, and 33 of FIG. 5 may be included in the low power level, low frequency stages of the transmitter, for example between bandpass filter 7 and balanced modulator 8, as shown in FIG. 6. The same principle of operation applies for FIG. 6 as that explained in connection with FIGS. 3 and 4, but now the amplitude linearity compensation of the class B power amplifier stage 16 is effected in the transmitter alone, since the compression and expansion circuits 31–33 are now in the low power, low frequency stages of the transmitter.

What is claimed is:

1. A communication system comprising means for heterodyning an original signal up in frequency to the radio frequency range to produce a radio frequency signal, a class B power amplifier fed by said radio frequency signal and operating to amplify the same for transmission, said power amplifier having a nonlinear input-output characteristic and inherently operating to produce an output signal whose amplitude is nonlinearly related to the radio frequency input signal thereto, means for receiving the transmitted signal, means for heterodyning the received signal down in frequency to the intermediate frequency range, means for demodulating the intermediate frequency signal to reproduce the original signal, and circuit means connected in said system preceding said demodulating means for compensating for the nonlinearities in said input-output characteristic.

2. A communication system comprising first means for heterodyning an original signal up in frequency to the radio frequency range to produce a radio frequency signal, a class B power amplifier fed by said radio frequency signal and operating to amplify the same for transmission, said power amplifier having a nonlinear input-output characteristic and inherently operating to produce an output signal whose amplitude is nonlinearly related to the radio frequency input signal thereto, means for receiving the transmitted signal, second means for heterodyning the received signal down in frequency to the intermediate frequency range, means for demodulating the intermediate frequency signal to reproduce the original signal, and circuit means connected in said system following said second heterodyning means but preceding said demodulating means for compensating for the nonlinearities in said input-output characteristic.

3. A single sideband communication system comprising means for heterodyning an original single sideband signal up in frequency to the radio frequency range to produce a radio frequency single sideband signal, a class B power amplifier fed by said radio frequency single sideband signal and operating to amplify the same for transmission, said power amplifier having a nonlinear input-output characteristic and inherently operating to produce an output signal whose amplitude is nonlinearly related to the radio frequency single sideband input signal thereto, means for receiving the transmitted signal, means for heterodyning the received signal down in frequency to the intermediate frequency range, means for demodulating the intermediate frequency signal to reproduce the original single sideband signal, and means including a compression circuit for compensating for the nonlinearities in said input-output characteristic, said compensating means being connected in said system preceding said demodulating means.

4. A single sideband communication system comprising means for heterodyning an original single sideband signal up in frequency to the radio frequency range to produce a radio frequency single sideband signal, a class B power amplifier fed by said radio frequency single sideband signal and operating to amplify the same for transmission, said power amplifier having a nonlinear input-output characteristic and inherently operating to produce an output signal whose amplitude is nonlinearly related to the radio frequency single sideband input signal thereto, means for receiving the transmitted signal, means for heterodyning the received signal down in frequency to the intermediate frequency range, means for demodulating the intermediate frequency signal to reproduce the original single sideband signal, and means including an expansion circuit for compensating for the nonlinearities in said input-output characteristic, said compensating means being connected in said system preceding said demodulating means.

5. A single sideband communication system comprising means for heterodyning an original single sideband signal up in frequency to the radio frequency range to produce a radio frequency single sideband signal, a class B power amplifier fed by said radio frequency single sideband signal and operating to amplify the same for transmission, said power amplifier having a nonlinear input-output characteristic and inherently operating to produce an output signal whose amplitude is nonlinearly related to the radio frequency single sideband input signal thereto, means for receiving the transmitted signal, means for heterodyning the received signal down in frequency to the intermediate frequency range, means for demodulating the intermediate frequency signal to reproduce the original single sideband signal, and means including a compression circuit and also an expansion circuit for compensating for the nonlinearities in said input-output characteristic, said compensating means being connected in said system preceding said demodulating means.

6. A single sideband communication system comprising a balanced modulator, means feeding an original single sideband signal to said modulator, a source of heterodyning energy coupled to said modulator to heterodyne said original signal up in frequency, a separate adjustable coupling from the output of said source to the output of said modulator to mix an adjustable amount of energy of the heterodyning frequency with said modulator output, additional means for heterodyning the output of said modulator up in frequency to the radio frequency range to produce a radio frequency single sideband suppressed carrier signal, a class B power amplifier fed by said last-mentioned signal and operating to amplify the same for transmission, said power amplifier having a nonlinear input-output characteristic and inherently operating to produce an output signal whose amplitude is nonlinearly related to the radio frequency single sideband suppressed carrier input signal thereto, means for receiving the transmitted signal, means for heterodyning the received signal down in frequency to the intermediate frequency range, means for demodulating the intermediate frequency signal to reproduce the original single sideband signal, and circuit means connected in said system preceding said demodulating means for compensating for the nonlinearities in said input-output characteristic.

7. A single sideband communication system comprising a balanced modulator, means feeding an original single sideband signal to said modulator, a source of heterodyning energy coupled to said modulator to heterodyne said original signal up in frequency, a separate adjustable coupling from the output of said source to the output of said modulator to mix an adjustable amount of energy of the heterodyning frequency with said modulator output, additional means for heterodyning the output of said modulator up in frequency to the radio frequency range to produce a radio frequency single sideband suppressed carrier signal, a class B power amplifier fed by said last-mentioned signal and operating to amplify the same for transmission, said power amplifier having a nonlinear input-output characteristic and inherently operating to produce an output signal whose amplitude is nonlinearly related to the radio frequency single sideband suppressed carrier input signal thereto, means for receiving the transmitted signal, means for heterodyning the received signal down in frequency to the intermediate frequency range, means for demodulating the intermediate frequency signal to reproduce the original single sideband signal, and means including a compression circuit and also an expansion circuit for compensating for the nonlinearities in said input-output characteristic, said compensating means being connected in said system preceding said demodulating means.

References Cited in the file of this patent

UNITED STATES PATENTS

| | | |
|---|---|---|
| 1,975,371 | Place | Oct. 2, 1934 |
| 2,074,047 | Dechant | Mar. 16, 1937 |
| 2,095,050 | Beverage | Oct. 5, 1937 |
| 2,248,757 | Herold | July 8, 1941 |
| 2,285,085 | Hagen | June 2, 1942 |
| 2,393,936 | Romander | Jan. 29, 1946 |
| 2,724,742 | Chesnut | Nov. 22, 1955 |
| 2,808,504 | Neumann et al. | Oct. 1, 1957 |